United States Patent [19]
Abraham et al.

[11] Patent Number: 5,317,306
[45] Date of Patent: May 31, 1994

[54] SYSTEM AND METHOD FOR DYNAMIC CONTROL OF HORIZONTAL SCROLLING

[75] Inventors: Robert L. Abraham, Marietta; Vincent J. Osisek, Acworth, both of Ga.

[73] Assignee: International Business Machines Corporation, Armonk, N.Y.

[21] Appl. No.: 741,294

[22] Filed: Aug. 2, 1991

[51] Int. Cl.$^5$ .............................................. G09G 1/16
[52] U.S. Cl. .................................... 345/118; 345/124; 395/144
[58] Field of Search ............... 340/721, 724, 726, 792; 395/144, 145, 156, 149, 148

[56] References Cited

U.S. PATENT DOCUMENTS

| | | | |
|---|---|---|---|
| 4,434,475 | 2/1984 | McCaskill et al. | 395/156 |
| 4,506,343 | 3/1985 | Shipp, Jr. et al. | 395/144 |
| 4,736,308 | 4/1988 | Heckel | 395/144 |
| 4,823,288 | 4/1989 | Ueno et al. | 395/145 |
| 4,953,105 | 8/1990 | Hirata et al. | 395/149 |
| 4,970,502 | 11/1990 | Kunikane et al. | 395/144 |
| 5,001,697 | 3/1991 | Torres | 395/156 |
| 5,038,138 | 8/1991 | Akiyama et al. | 340/724 |

Primary Examiner—Alvin E. Oberley
Assistant Examiner—Gin Goon
Attorney, Agent, or Firm—John J. Timar; Lauren C. Bruzzone

[57] ABSTRACT

A method and system for dynamically controlling the horizontal scrolling of data contained in a stored table of arbitrary size in a windowing environment. The list of data to be scrolled through is stored in memory with certain columns designated as sticky. Responsive to input from the user, a process is invoked to either scroll left or right through data contained in the stored list. A "must display" column is determined based on the current display in the window and the direction of scrolling. The sticky columns that can fit with the "must display" column are determined and placed on the display. Sticky columns that cannot be placed on the display with the "must display" column due to window size limitations are temporarily suppressed. Additional non-sticky columns are placed on the display on a space-available basis including the placement of a partial column that fills the display.

29 Claims, 7 Drawing Sheets

---

EC Deliverables                                                           More: < >

| ID | Deliverable Name | Actual Complete | Status | Activity Locat |
|---|---|---|---|---|
| 10100 | Prototype | | Active | Bethesda, Mary |
| 10110 | Cad Drawing | 03/31/90 | Complete | Atlanta, Georg |
| 10111 | Cad Drawing | | Waiting | Atlanta, Georg |
| 10220 | Structured Bill of Materials | | Waiting | Kingston, New |
| 10221 | Structured Bill of Materials | | Waiting | Kingston, New |
| 10330 | Tooling Data | 04/02/90 | Complete | Atlanta, Georg |
| 10331 | Tooling Data | | Active | Atlanta, Georg |
| 10440 | Cost Estimate | | Waiting | Hannover, Germ |
| 10441 | Cost Estimate | | Waiting | Hannover, Germ |

| Planned Start | Actual Start | Planned Complete | Actual Complete | Status | Activity Location |
|---|---|---|---|---|---|
| | | EC Deliverables | | | More: < |
| 04/02/90 | 03/31/90 | 04/24/90 | | Active | Bethesda, Maryland |
| 03/15/90 | 03/15/90 | 04/24/90 | 03/31/90 | Complete | Atlanta, Georgia |
| 03/20/90 | | 04/24/90 | | Waiting | Atlanta, Georgia |
| 03/15/90 | | 04/24/90 | | Waiting | Kingston, New York |
| 03/20/90 | | 04/24/90 | | Waiting | Kingston, New York |
| 03/15/90 | 03/23/90 | 04/24/90 | 04/02/90 | Complete | Atlanta, Georgia |
| 03/20/90 | 03/23/90 | 04/24/90 | | Active | Atlanta, Georgia |
| 04/02/90 | | 04/24/90 | | Waiting | Hanover, Germany |
| 04/02/90 | | 04/24/90 | | Waiting | Hanover, Germany |

FIG 3

| | | EC Deliverables | | | More: < > |
|---|---|---|---|---|---|
| ID | Deliverable Name | Planned Start | Actual Start | Planned Complete | Actual Complete |
| 10100 | Prototype | 04/02/90 | 03/31/90 | 04/24/90 | |
| 10110 | Cad Drawing | 03/15/90 | 03/15/90 | 04/24/90 | 03/31/90 |
| 10111 | Cad Drawing | 03/20/90 | | 04/24/90 | |
| 10220 | Structured Bill of Materials | 03/15/90 | | 04/24/90 | |
| 10221 | Structured Bill of Materials | 03/20/90 | | 04/24/90 | |
| 10330 | Tooling Data | 03/15/90 | 03/23/90 | 04/24/90 | 04/02/90 |
| 10331 | Tooling Data | 03/20/90 | 03/23/90 | 04/24/90 | |
| 10440 | Cost Estimate | 04/02/90 | | 04/24/90 | |
| 10441 | Cost Estimate | 04/02/90 | | 04/24/90 | |

FIG 4

| | EC Deliverables | | | | More: < > |
|---|---|---|---|---|---|
| ID | Deliverable Name | Planned Start | Actual Start | Planned Complete | Actu Comp |
| 10100 | Prototype | 04/02/90 | 03/31/90 | 04/24/90 | |
| 10110 | Cad Drawing | 03/15/90 | 03/15/90 | 04/24/90 | 03/3 |
| 10111 | Cad Drawing | 03/20/90 | | 04/24/90 | |
| 10220 | Structured Bill of Materials | 03/15/90 | | 04/24/90 | |
| 10221 | Structured Bill of Materials | 03/20/90 | | 04/24/90 | |
| 10330 | Tooling Data | 03/15/90 | 03/23/90 | 04/24/90 | 04/0 |
| 10331 | Tooling Data | 03/20/90 | 03/23/90 | 04/24/90 | |
| 10440 | Cost Estimate | 04/02/90 | | 04/24/90 | |
| 10441 | Cost Estimate | 04/02/90 | | 04/24/90 | |

*FIG 5*

| | EC Deliverables | | | More: < > |
|---|---|---|---|---|
| ID | Deliverable Name | Actual Complete | Status | Activity Locat |
| 10100 | Prototype | | Active | Bethesda, Mary |
| 10110 | Cad Drawing | 03/31/90 | Complete | Atlanta, Georg |
| 10111 | Cad Drawing | | Waiting | Atlanta, Georg |
| 10220 | Structured Bill of Materials | | Waiting | Kingston, New |
| 10221 | Structured Bill of Materials | | Waiting | Kingston, New |
| 10330 | Tooling Data | 04/02/90 | Complete | Atlanta, Georg |
| 10331 | Tooling Data | | Active | Atlanta, Georg |
| 10440 | Cost Estimate | | Waiting | Hannover, Germ |
| 10441 | Cost Estimate | | Waiting | Hannover, Germ |

*FIG 6*

SYSTEM AND METHOD FOR DYNAMIC CONTROL OF HORIZONTAL SCROLLING

BACKGROUND OF THE INVENTION

This invention relates generally to data display and control systems and more particularly to a technique for the dynamic control of horizontal scrolling on a data display device.

In data processing systems, an application often has information for users that is too large to fit on the display screen. Applications, therefore, provide users with the ability to scroll information both vertically and horizontally. Furthermore, in a windowing environment, scrolling capabilities are even more important because several windows can appear on the screen simultaneously, limiting the space available for information in each window. Users have the ability to change the size of windows dynamically in a windowing environment, further limiting the available display space.

During the horizontal scrolling of a display list containing more columns of information than can be displayed simultaneously, certain columns are made "sticky" in order to provide the view-to-view continuity necessary to maintain the context of the data. Sticky columns are those columns in a displayed list that remain in place when the user makes a request to scroll the list horizontally. Sticky columns usually represent key values that help to identify a row and remain in place when the remainder of the columns are shifted. Sticky columns are always the leftmost columns in a displayed list and can fill the entire display window.

Several existing systems use combinations of hardware and software to control the scrolling of data on display screens. One example is U.S. Pat. No. 4,803,478 to Olsen. This patent teaches an apparatus for horizontal scrolling on a screen display on a character-by-character, or line-by-line basis. A scroll control memory is provided with the video memory for storing at least one bit for controlling horizontal scrolling on a character-by-character basis.

Other related art includes U.S. Pat. No. 4,769,637, U.S. Pat. No. 4,602,251, U.S. Pat. No. 4,412,294, U.S. Pat. No. 4,873,514 and U.S. Pat. No. 4,506,343. However, none of the aforementioned patents provide a capability for the software-controlled horizontal scrolling of a stored list of data of arbitrary size in a window on a display screen that can be dynamically altered through the user's interface with an application. Existing software applications permit horizontal scrolling of data through a stored list; however, these applications are tailored specifically for the data in the stored list. Consequently, the stored list has a fixed and known table dimension, and the data is displayed on the entire screen. A specific example is the CALLUP software product, a licensed program of International Business Machines Corporation. CALLUP is an internal telephone book, organization directory, and directory of services in electronic form.

The present invention overcomes this deficiency of existing systems.

SUMMARY OF THE INVENTION

It is an object of this invention to provide a method for the dynamic control of horizontal scrolling of data on a window display that provides view-to-view continuity of the displayed data.

It is another object of this invention to provide a method that dynamically determines the number of sticky columns that can be displayed while still providing display space in the window for at least one column of non-sticky information.

It is a further object of this invention to provide a method for the horizontal scrolling of a stored list of data of arbitrary size in a window of arbitrary and changeable size.

It is a still further object of this invention to provide a method for dynamically controlling the placement of a partial column in the remaining display space available on the right edge of the display that is predicated on the direction of scroll.

These and other objects and advantages are accomplished by the present invention which invokes a horizontal scrolling process when there is insufficient space to accommodate all the sticky columns as well as at least one non-sticky column. The invention actually implements two separate processes with the direction of scrolling determining which process is invoked. The number of sticky columns that can be displayed is determined dynamically based on how many sticky columns can fit while still leaving sufficient space for at least one column of new non-sticky information.

A "must display" column is defined based on the direction of scrolling. For scrolling right, the "must display" column is the rightmost column currently on the display if that column is not shown in full. If the current rightmost column is fully displayed, the must display column is the column to the immediate right of the currently displayed rightmost column. For scrolling left, the must display column is the column to the immediate left of the currently displayed leftmost column.

A better appreciation of these and other advantages and features of the present invention, as well as the manner in which the present invention realizes them, will be gained from the following detailed description and accompanying drawings of the preferred embodiment, and from the claims.

BRIEF DESCRIPTION OF THE DRAWINGS

FIG. 3 illustrates a panel display after a horizontal scrolling of the same data to the right with no sticky columns defined.

FIG. 4 illustrates the effect of horizontal scrolling with the first two columns in the displayed list defined as sticky columns.

FIG. 5 illustrates the effect of horizontal scrolling resulting in a displayed non-sticky column of data.

FIG. 6 illustrates the effect of an additional horizontal scroll to the right subsequent to the display of FIG. 5.

DETAILED DESCRIPTION OF THE PREFERRED EMBODIMENT

Figures 1, 2:
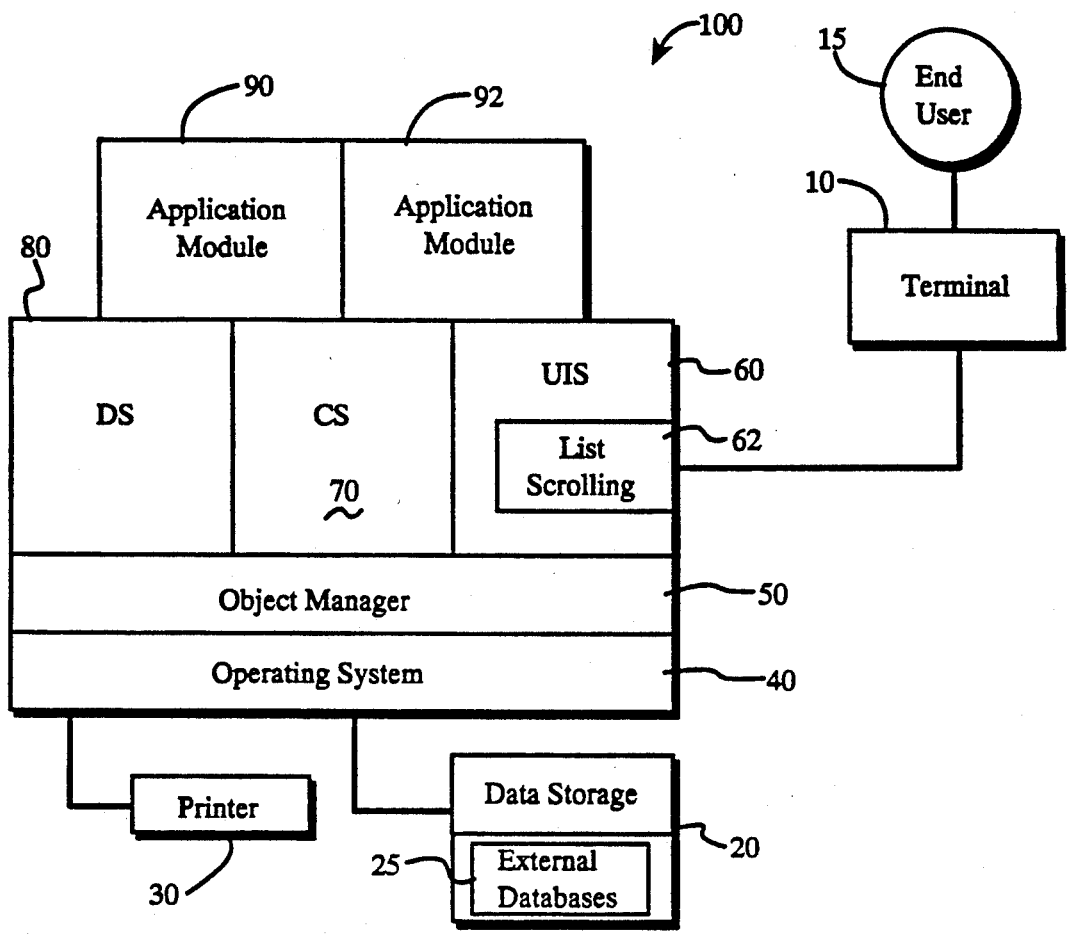
FIG. 1 illustrates a graphical representation of a computing environment in which the present invention operates.
FIG. 2 illustrates a panel display of part of a stored list containing more columns of data than can be displayed simultaneously.

As shown in FIG. 1, the present invention is a computer application program 62 which is embedded in the User Interface Server program 60. The computer platform 100 includes operating system 40, an Object Manager 50, Communications Server 70, Data Server 80 and application modules 90, 92. Not shown are the hardware components, i.e., the central processor and main memory. Various peripheral components are connected to the computer platform 100, including terminal 10, data storage device 20, and printing device 30. The data storage device 20 is also called secondary storage and may include hard disks and tape drives. The data storage device 20 represents non-volatile storage and is used for storing external database 25. Users 15 interact with the computer platform 100 and the application modules 90, 92 via the terminal 10.

Object Manager 50 provides services that control an object-oriented computing environment. Object Manager 50 manages class structures and locations in memory, loads class modules and materializes instances automatically when needed, passes messages between objects and maintains database integrity.

The Data Server (DS) 80 provides services that control access to objects in the external database 25. These services include attributes and methods that bring a single data object into memory. The object can be manipulated in memory and stored to the external database 25. Communications Server (CS) 70 is a collection of objects that provides the ability to transfer data between different nodes and systems. It supports a single interface to communication enablers which send data to or receive data from network destinations.

The User Interface Server (UIS) 60 manages the interactions between user-developed applications and the user 15 working at terminal 10. UIS 60 is responsible for controlling panel management and the processing of pop-ups, lists and other fields in a windowing environment. The terms panel and window are used interchangeably in this specification. UIS 60 also provides support for the translation of various types of data entered through panels and stored in the database 20. UIS 60 enables the creation, display and processing of panels. List scrolling process 62 is embedded in UIS 60 and is the subject of the present invention.

A typical information panel that can be controlled by list scrolling process 62 is illustrated in FIG. 2. The panel shown in FIG. 2 demonstrates a list that has additional information to the right of the information currently being displayed. This is indicated by the "More: >" notation on the top right portion of the panel. This notation means not only that there is more information that can be displayed, but also indicates the direction of scrolling required to display the additional information. The particular panel displayed is labeled EC Deliverables (for engineering change deliverables in a manufacturing enterprise) and includes columns for the deliverable identification number and name, item number and responsible person. For the purpose of this invention, column is synonymous with a data field, and does not refer to the physical column on the screen used to display a single character.

Scrolling the panel horizontally allows additional columns of data to be displayed such as those shown in FIG. 3, which contain planned start, actual start, planned completion, actual completion, status and activity location columns. If scrolling is implemented simply by logically shifting the data on the panel to the left by an entire screen full of data, then the user viewing the panel will have a difficult time ascertaining the deliverable item or context represented by each line. The notation "More: <" indicates that additional information is now to the left of the information currently displayed.

FIG. 4 illustrates how the concept of sticky columns enables the user to retain view-to-view continuity of the data as the screen is scrolled horizontally. Sticky columns are those columns that stay in place even if the remainder of the columns are shifted. For the stored list of data shown in FIGS. 2 and 3, it is assumed that the "ID" and "Deliverable Name" columns are sticky. The display in FIG. 4 shows the results after the first horizontal scroll to the right. In this case there are scrollable areas to both the left and the right of the displayed portion of the list. This is indicated by the "More: < >" notation at the top right of the screen.

The main problem addressed by this invention is that of handling the situation in which there is insufficient display space to accommodate all the sticky columns as well as at least one non-sticky column. This can occur either when there are so many sticky columns defined that there is inadequate display space for any non-sticky columns, or when there is at least one non-sticky column whose width is greater than the display space left over after all the sticky columns are placed. An additional problem solved is how to handle a column that can only be partially displayed in the space remaining within the panel window.

Illustrated in FIG. 5 is a partially displayed column using the same data as in FIG. 4, but with a slightly wider "Deliverable Name" column. As shown in this figure, the "Actual Complete" column can be only partially displayed. Although in this example the window size remained unchanged, this invention handles the situation where the window size changes dynamically. Therefore, a slight decrease in window size from that shown in FIG. 4 with no change in column width could result in the partially displayed column of FIG. 5.

The process used by this invention to implement a sticky column scrolling policy provides for a near maximum scrolling of new information. It is considered near maximum in the sense that columns that were partially shown before flowing off the right edge of the window are shown in full after scrolling. Thus, any column that was partially displayed prior to scrolling will also be fully displayed on the scrolled panel. FIG. 6 shows the results of applying a horizontal scroll to the right to the data displayed in FIG. 5.

Sticky columns remain on the screen when the list displayed is scrolled left or right. However, some of these columns may be temporarily overlaid to show the contents of another column that is too wide to be shown with the sticky columns. The sticky columns are again visible after the wide column is scrolled off the screen. In the near maximum algorithm of this invention, the number of sticky columns that can be shown is determined dynamically based on the portion of the display window needed to display the "must display" column. After determining the maximum number of sticky columns that can be displayed, the near maximum amount of previously unshown columns are displayed.

When scrolling to the right, if the rightmost column currently displayed is not shown in full, then that column becomes the "must display" column. The width of the must display column is determined first. The "must display" column is shown in full on the display, limited only by the window size. The result of applying the scrolling process to the example of FIG. 5 is shown in FIG. 6. The "Actual Complete" column is the "must display" column and is now displayed in full.

After the width of the "must display" column has been determined, the number of sticky columns that can be placed is calculated based on available display space remaining. The sticky columns are placed on the display screen beginning with the first column displayed on the screen. Sticky columns continue to be placed on the display screen until a sticky column too wide to fit with the "must display" column is found, or any non-sticky column is reached. If the width of the "must display" column is too wide for any sticky column to be placed, then all sticky columns are suppressed.

The "must display" column is placed on the display screen after the sticky columns. Any remaining window space to the right of the "must display" column is filled with additional new columns. A partial column is shown on the right edge of the display window if the remaining space is insufficient to display it completely as depicted in FIGS. 5 and 6.

Scrolling left results in complete columns being shown except for a possible partial column on the right edge. It does not result in an exact reversal of the images seen when scrolling right because of the different treatment of a partially shown column. A "dynamic width" value is initialized to the width of the window available for display and is reduced by the width of the "must display" column and then the sticky columns as they are accepted for display. If there are more sticky columns than can be accommodated within the current width of the window, those sticky columns that do not fit on the initial display are treated as non-sticky and are suppressed until the window width is changed.

The first step in scrolling left is to find the first column currently displayed that was not placed solely because it was sticky. This involves scanning from the left and skipping over any group of sequential sticky columns to find the first non-sticky column displayed. This column will be the leftmost of the non-sticky columns placed on the current panel. Using the example of FIG. 6, this is the "Actual Complete" column. The column to the immediate left of this column, the "Planned Complete" column, becomes the initial or original "must display" column.

Following a determination of the width of the "must display" column, the number of sticky columns that can be displayed is calculated. Sticky columns are placed on the display screen beginning with the first column on the screen. Sticky columns continue to be placed on the display screen until a sticky column too wide to fit with the "must display" column is found, or any non-sticky column is reached. If the width of the "must display" column is too wide for any sticky column to be placed, then all sticky columns are suppressed.

The column to the left of the "must display" column is accepted for display if this column will fit with the width of the already placed sticky columns plus the width of the "must display" column. This column is then made the new "must display" column and its width is subtracted from the dynamic width. The steps of examining the width of the column to the left of the new "must display" column, accepting and marking it for display, resetting this column as the new "must display" column, and subtracting its width from the available dynamic width are repeated until no further columns can be accepted. This occurs when the width of the sticky columns and the width of the accepted non-sticky columns taken together occupy so much of the display screen that the addition of another column would exceed the physical space available for display.

After determining the non-sticky columns to display and starting at the leftmost of these columns, consecutive columns are placed to the right of any previously placed sticky columns. This continues to the right as complete columns and possibly a final partial column are placed on the display screen. The original "must display" column will always be one of the columns fully displayed. Using the example of FIG. 6, the scrolling left algorithm results again in the display shown in FIG. 5. In addition to the sticky columns "ID" and "Deliverable Name" and the "must display" column "Planned Complete", two other non-sticky columns are fully displayed, i.e., "Planned Start" and "Actual Start", and the previously displayed column "Actual Complete" is partially displayed.

The process for scrolling to the left avoids placement of partial columns towards the left edge of a panel. Therefore, it is possible that one or more columns on the left side of a scrolled-from panel may also be displayed on the right side of the new scrolled-to panel. This occurs if the first dynamic column that does not fit is wider than those leftmost columns of the scrolled-from panel. Since the column that did not fit could not be placed on the screen, there may be space to the right of the original "must display" column that can be used to display data columns, even though they were on the prior panel. Therefore, since the "Responsible Person" column could not be placed on the panel in FIG. 5, the "Actual Complete" column, which was also shown in the scrolled-from panel of FIG. 6, is displayed as a partial column.

Figure 7A:
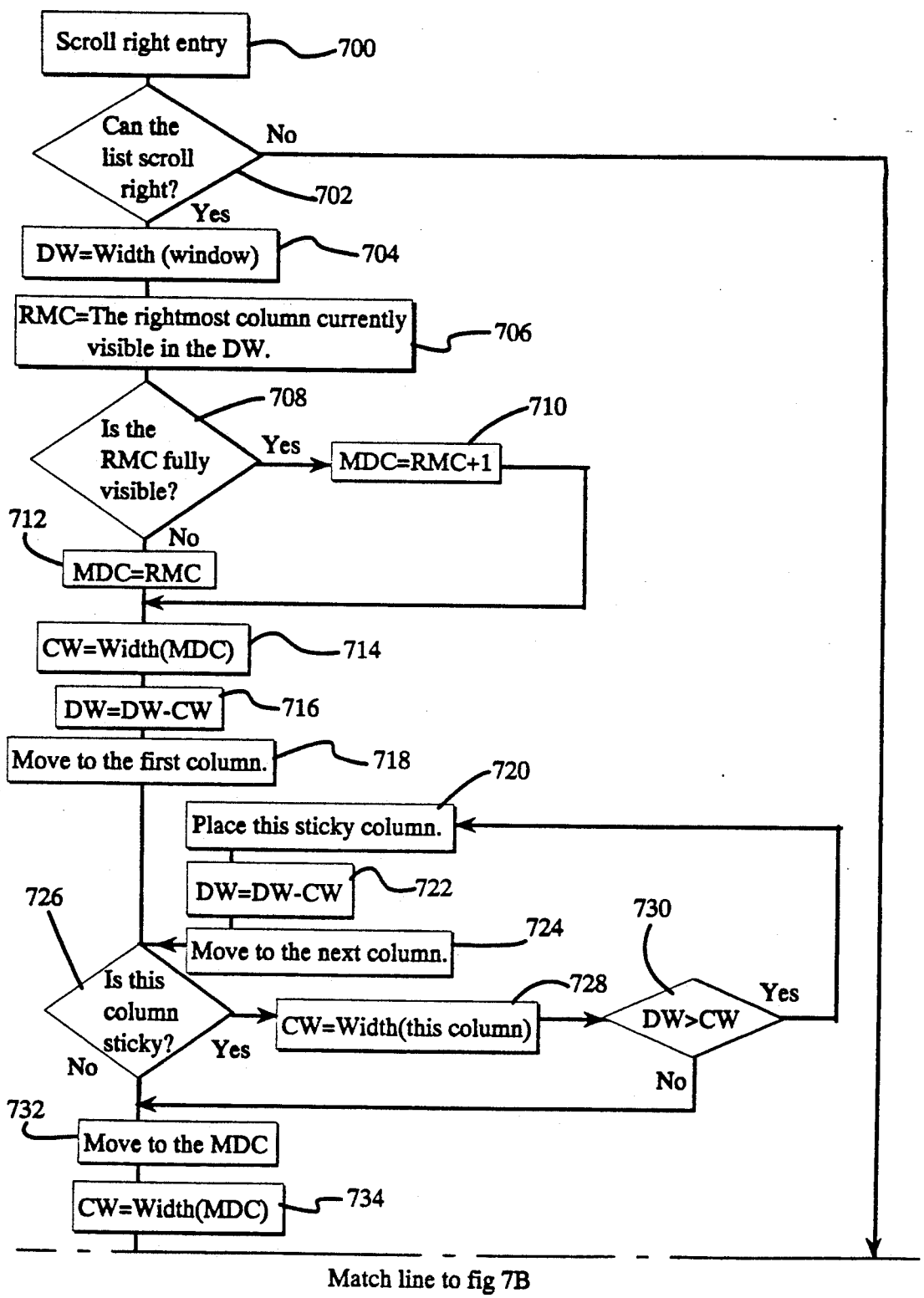
FIGS. 7A–7B are operational flowcharts of the present invention illustrating the process for horizontal scrolling to the right.
Figure 7B:
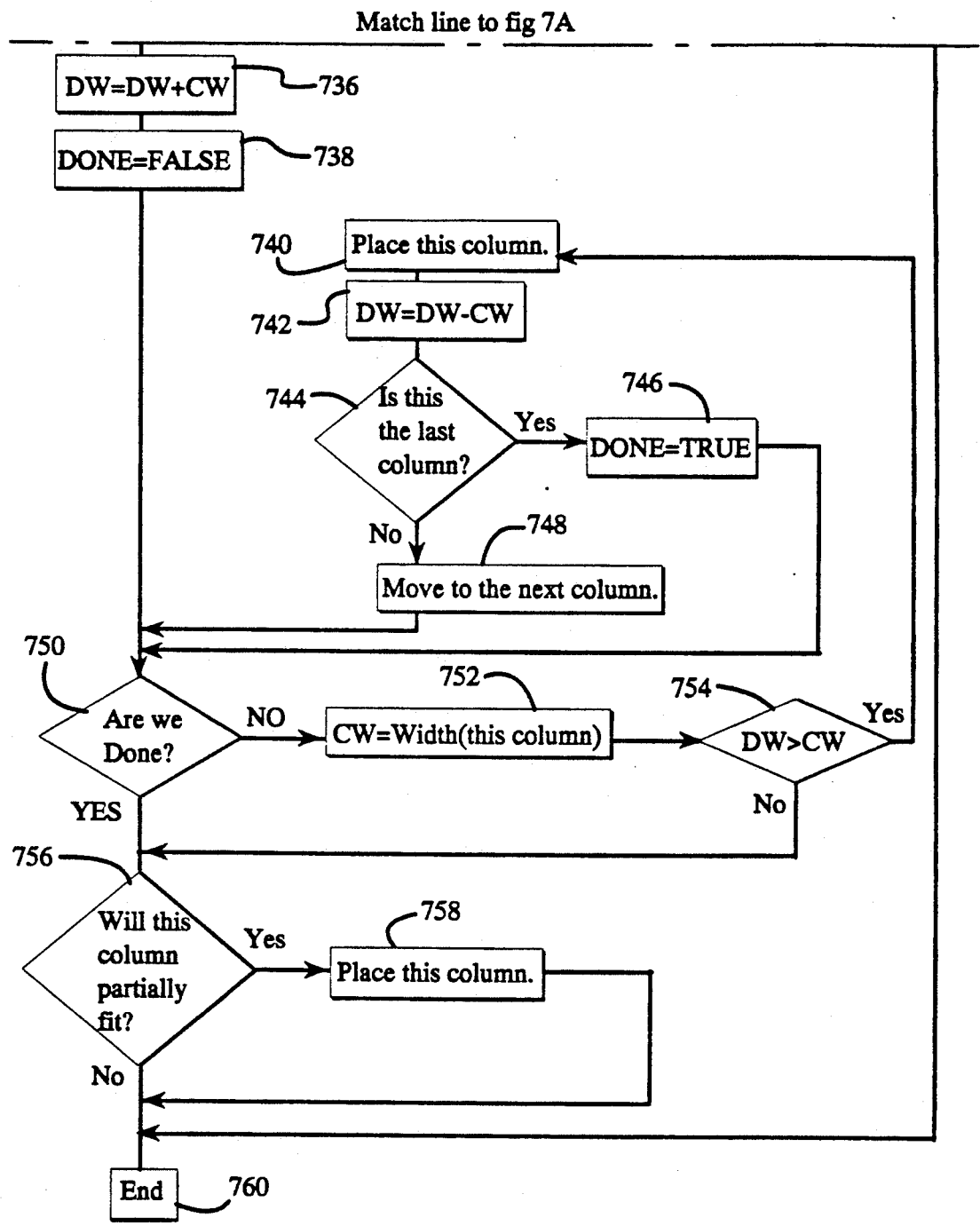

FIG. 7 is a flowchart representing the implementation of the process for scrolling a stored list of data to the right in a window on the display screen. Any columns in the stored list that are defined as sticky and which will not fit within the current width of the display window are treated as non-sticky before processing of a scroll command begins. Logic block 700 indicates that the first step is the receipt from the user of a command to scroll right. In decision block 702, a determination is made as to whether the list can be scrolled horizontally. A stored list can be scrolled to the right if there is more than one column in the stored list, and if there are columns to the right of the rightmost column currently displayed. If the list cannot be scrolled to the right, the algorithm is exited at block 760. If the list can be scrolled, the next steps in the process are to set the dynamic width (DW) to the width of the window on the display screen (logic block 704) and to set the rightmost column (RMC) to the rightmost column currently visible in the display window (logic block 706). In a windowing environment, the width of the displayed windows can be physically modified by the user as he interacts with applications on the display screen. Since the width of a display window can be varied between scrolling operations, the dynamic width must be reset to the current width of the window in which the list is being displayed.

The process executes decision block 708 to determine if the RMC is fully or partially visible. If fully visible, the "must display" column (MDC) is set to the next column in the stored list as indicated in logic block 710.

Otherwise, the "must display" column is set to the partially visible rightmost column, which then becomes fully visible on the next display. Determination of the "must display" column is followed in logic block 714 by setting the column width to the width of the "must display" column. Next, in logic block 716 the process resets the dynamic width (DW) to the width of the screen area still available to display columns. This is the original dynamic width less the width of the "must display" column.

After determining the "must display" column and its width, and adjusting the dynamic width of the window, the column pointer is set to point to the first column in the stored list as indicated in logic block 718. The loop entered into at decision block 726 is executed next to identify whether a column is sticky and to then place the sticky column on the display screen. Decision block 726 first tests if the current column is sticky, and if it is, whether or not it will fit in the display area to the left of the "must display" column and within the available dynamic width. In logic block 728, the column width is set to the width of the sticky column currently pointed to by the column pointer. Next, in decision block 730, a test is made to determine if the available dynamic width exceeds the column width. Only if both of these conditions are satisfied (i.e., column is sticky and fits on display) will the current column be placed on the display. Otherwise, the process advances to logic block 732 where the column pointer is advanced to the "must display" column. The effect of decision block 726 and decision block 730 is to temporarily suppress any sticky columns that cannot be accommodated in the dynamic width determined by the "must display" column. After determining that a sticky column will fit in the available dynamic width, logic block 720 places the sticky column on the display. The available dynamic width is adjusted again by subtracting the column width of the sticky column just placed.

Upon reaching a non-sticky column or a sticky column that will not fit in the available dynamic width, the column pointer is moved to point to the "must display" column in the stored list in logic block 732, and is followed by resetting of the column width to the width of the "must display" column in logic block 734. The available dynamic width is increased by the width of the "must display" column in logic block 736.

A scroll completion flag is set to "FALSE" in logic block 738 to ensure that at least one column, i.e., the "must display" column is placed on the display before the process to scroll right is terminated. Decision block 750 commences a loop that places non-sticky columns in the remaining portion of the display window still available. This first pass through the loop results in the "must display" column being placed on the display. In decision block 750 a test is made on the scroll completion flag. As long as the flag remains set as "FALSE", the column width is set to the width of the column currently pointed to as indicated by logic block 752. In decision block 754, a test is made to determine if the available dynamic width exceeds the current column width. If it does, then the column is placed on the display in logic block 740. For the first pass, these steps always result in the placement of the "must display" column except for the case in which the width of the "must display" column exceeds the entire width of the window. In logic block 742, the available dynamic width is readjusted by subtracting the width of the column just placed. This is followed by the test in decision block 744 to determine if the last column in the stored list has been reached. If it has, the scroll completion flag is set to "TRUE" in logic block 746. Otherwise, the current column pointer is advanced to point to the next column in the stored list as indicated in logic block 748.

After executing logic block 746 or logic block 748, the process again checks the scroll completion flag in decision block 750. The loop to place non-sticky columns is repeated if the flag is still set to "FALSE" indicating that the last column in the stored list has not been reached. Otherwise, decision block 756 is executed to determine if the column currently pointed to will partially fit on the display. Decision block 756 is reached from either decision block 750 or decision block 754, depending upon whether the last column in the stored list has been reached, or a non-sticky column is pointed to that cannot fit on the display screen. If the column can partially fit, the "partial" column is placed on the display in logic block 758. Otherwise, the process is exited at logic block 760. For the exceptional case in which the width of the "must display" column exceeds the window size, logic block 758 places as much as possible of the "must display" column with no other column displayed.

Figure 8A:
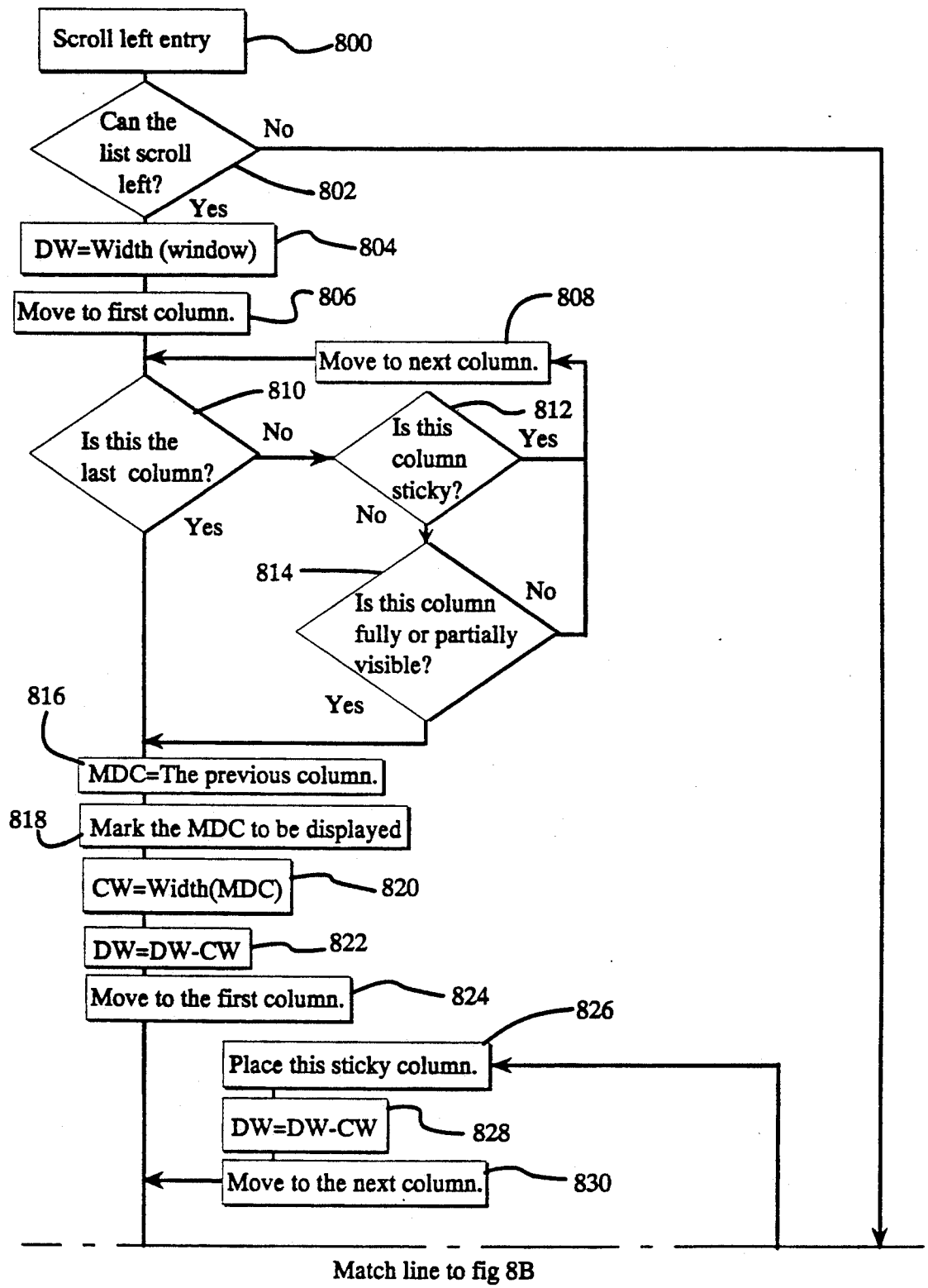
FIGS. 8A–8B are operational flowcharts of the present invention illustrating the process for horizontal scrolling to the left.
Figure 8B:
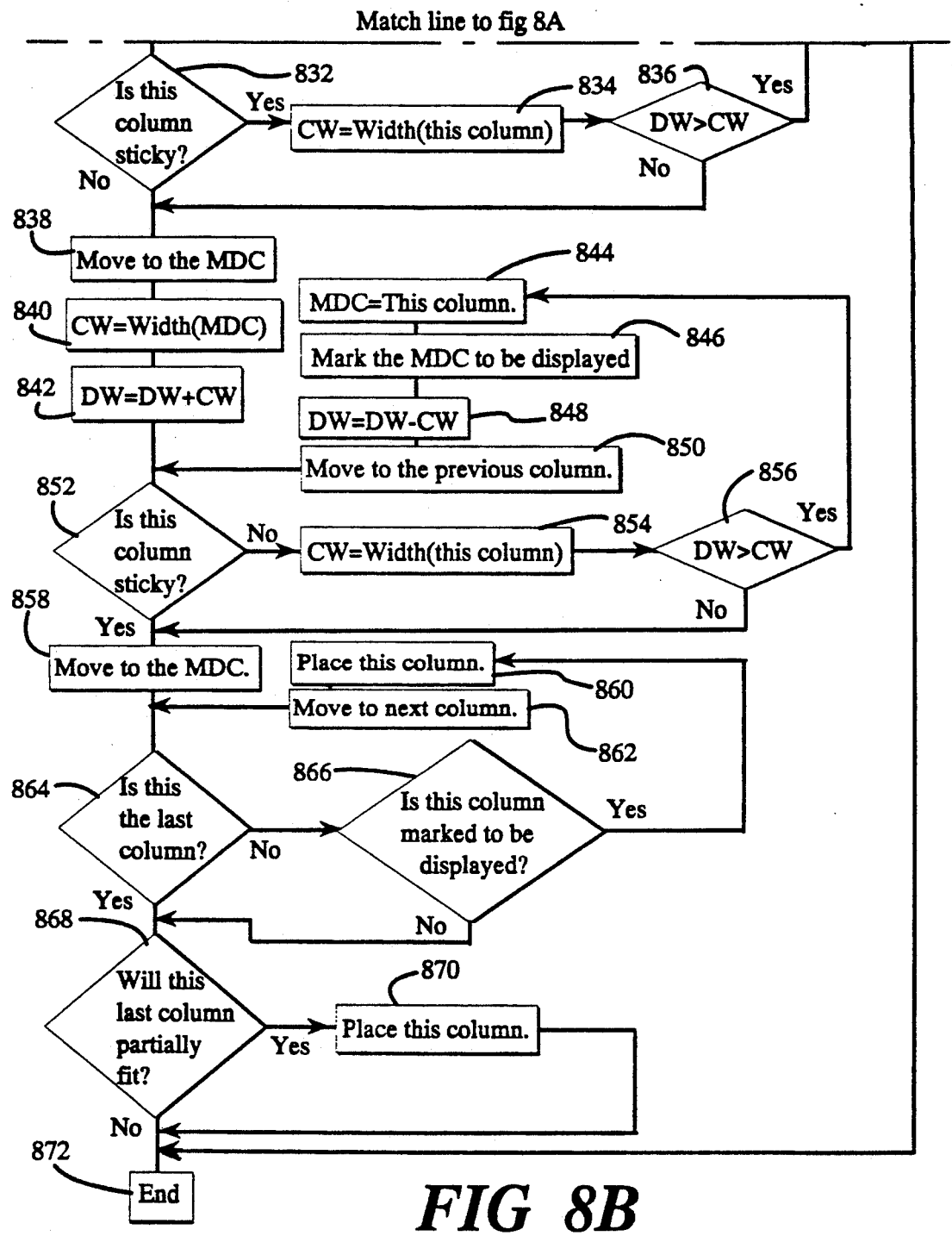

The flowchart representing the implementation of the process for scrolling a stored list of data to the left in a window on the display screen is presented in FIG. 8. Logic block 800 indicates the receipt of a command to scroll left from the user. In the initial decision block 802, a determination is made as to whether or not the stored list can be scrolled to the left. Scrolling to the left is possible if there is more than one column in the stored list, and if there has been a previous scroll to the right. If the list cannot be scrolled to the left, the process is exited at block 872. Otherwise, the dynamic width is set equal to the width of the window available for display, and a pointer is initialized to point to the first column in the stored list. These steps are as indicated in logic blocks 804 and 806.

The scroll left process next executes a loop to determine the "must display" column. In decision block 810, a test is made to determine if the current column pointed to is the last column in the stored list. If it is not, then in decision block 812, the algorithm determines if the current column is sticky. If the current column is sticky, then the column pointer is advanced to the next column in logic block 808. If it is non-sticky, decision block 814 tests to determine whether the column is fully or partially visible. If the current column pointed to in the stored list is not fully or partially visible, then logic block 808 is executed to advance the current column pointer to the next column in the stored list. When a column is found in decision block 814 that is non-sticky and either partially or fully visible, logic block 816 sets the "must display" column to the previous column in the stored list. In logic block 818 the MDC is marked to be displayed in the display window. In logic block 820, the column width is set to the width of the "must display" column. This is followed by setting the available dynamic width equal to the remaining screen area available to display columns as indicated in logic block 822. This is equal to the dynamic width of the window less the column width of the "must display" column.

The process for scrolling left then goes through processing to identify the sticky columns to be placed in the display window. In logic block 824, the column pointer returns to the first column in the stored list. The loop initiated at decision block 832 identifies and places the sticky columns in the display window. Decision block 832 checks to determine if the current column is sticky. If it is, then logic block 834 sets the column width to the width of the current column. In decision block 836, a test is made to see if the available dynamic width exceeds the width of the current column. If there is enough room to display the sticky column, then it is placed in the window as indicated in logic block 826. This is followed by reducing the available dynamic width by the width of the sticky column as indicated in logic block 828. The current column pointer is then advanced to point to the next column in the stored list in logic block 830. The loop is then repeated. If in decision block 832, the current column pointed to is not sticky, or if it is sticky and will not fit to the left of the "must display" column within the display window as tested for in decision block 836, the current column pointer is moved in logic block 838 to point to the "must display" column. The column width is set to the width of the "must display" column in logic block 840, and the available dynamic width is adjusted upwards by the width of the "must display" column in logic block 842.

The next loop in the process for scrolling left is then executed to identify the non-sticky columns that can be placed in the remaining display window on the left scroll. In decision block 852, a test is made again to determine if the current column pointer is pointing to a sticky column in the stored list. If it is, the process drops out of the loop at logic block 858. If the column pointed to is non-sticky, the process first sets the column width in logic block 854 and then executes decision block 856 to determine if the current column will fit to the right of the already placed sticky columns, and to the left of the "must display" column within the available dynamic width. On the first pass, these steps ensure the placement of the "must display" column except for the situation in which the width of the "must display" column is greater than the width of the window. If the column cannot be placed, then the process drops out of the loop at logic block 858. However, if it can be placed in the window, the "must display" column is reset to this current column in logic block 844 and the current column is marked to be displayed in logic block 846. Next, the available dynamic width is reduced by the width of the current column in logic block 848. Logic block 850 moves the current column pointer to point to the previous column in the stored list, and the loop for finding columns to place is then repeated.

After dropping out of this loop columns are placed in the window to the right of the already placed sequential sticky columns. The process to scroll left sets the current column pointer to point to the last column to be identified as a "must display" column in logic block 858. Decision block 864 tests to determine if the last column in the stored list has been reached. If the last column in the list has not been reached, decision block 866 tests to determine if the column has been marked for display. If it has, then this column is placed on the display as indicated in logic block 860 and the current counter is moved to the next column as indicated in logic block 862. If it has not been marked for display, or if it is the last column in the stored list, then it can still be placed on the display. Decision block 868 checks to determine if it will partially fit within the available dynamic width. If the column cannot fit within the available dynamic width, then the process exits in logic block 872. Otherwise, this column is placed on the display in logic block 870 and the process exits in logic block 872. For the exceptional case in which the width of the "must display" column exceeds the window size, logic block 870 results in the placement of as much as possible of the "must display" column with no other columns displayed. There are variations on how the exceptional case can be handled including simple truncation of the excess width or enabling this column to be scrolled itself. Likewise, variations are possible on how partially displayed columns are treated. For example, instead of fully displaying a column previously shown in part, it is possible to only display the previously unshown portion on a scroll to the right. Another possibility is to display a partial column at the left edge for scrolls to the left.

While the invention has been particularly shown and described with reference to the preferred embodiment thereof, it will be understood by those skilled in the art that various changes in form and details may be made therein without departing from the spirit and scope of the invention. These changes can include microcode or hardware implementations of the invention.

Having thus described our invention, what we claim as new, and desire to secure by Letters Patent is:

1. A method for the dynamic control of horizontal scrolling of data from a stored list in a window on a display screen, said method comprising:
    adjusting the size of the window available for the display of data in the stored list in response to a first user command;
    receiving a second user command to scroll through the stored list in a specified direction; and
    determining if the stored list can be scrolled in the specified direction;
    determining the dynamic width of the window available for the display of data;
    determining a must display column in said stored list and reducing the space available in the window by the width of the must display column;
    scanning through the columns in the stored list to determine the columns that are designated as sticky and placing said sticky columns in the window; and
    placing said must display column and additional columns from said stored list in the available space remaining in the window until the window is full.

2. The method of claim 1 wherein the step of placing sticky columns in the window includes:
    determining the width of each sticky column in the stored list in sequence;
    comparing the width of each sticky column with the available space remaining in the window; and
    adjusting the available space remaining by the width of each sticky column after it is placed in the window.

3. The method of claim 1 wherein the step of placing additional columns includes:
    determining the width of each additional column in the stored list in sequence;
    comparing the width of each additional column with the available space remaining in the window; and
    reducing the available space remaining by the width of each additional column after it is placed in the window.

4. The method of claim 1 wherein the step of determining the must display column includes:
    if the direction of scroll is to the right, determining the rightmost column currently visible in the window, marking this column as the must display column if it is partially visible, and marking the next column in the stored list as the must display column if the rightmost column is completely visible;

if the direction of scroll is to the left, determining the first column that is not sticky and that is currently fully or partially visible in the window, and marking the previous column in the stored list as the must display column.

5. The method of claim 2 wherein the step of placing sticky columns further includes removing the designation as sticky of each sticky column that cannot be placed within the available space remaining in the window, and processing each sticky column no longer designated as sticky as an additional column until the width of the window is changed.

6. The method of claim 2 wherein the step of placing sticky columns further includes temporarily suppressing each sticky column that cannot be fully accommodated with the must display column in the available space remaining in the window.

7. The method of claim 3 wherein the step of placing additional columns further includes determining if the last column in the stored list has been reached, and if it has, placing said last column in the window if it can partially or completely fit in the available space remaining.

8. The method of claim 3 wherein the step of placing additional columns further includes partially placing a column during a scroll to the right if its width exceeds the available space remaining and terminating the horizontal scrolling of data when no available space remains.

9. The method of claim 3 further including the steps of determining if at least one column located to the immediate right of the must display column in a scroll to the left can be at least partially displayed in the available space remaining in the window after the placement of the sticky columns, the must display column, and any additional columns to the left of the must display column, and then placing each of said columns located to the immediate right that can be at least partially displayed.

10. In a computer-based data processing system, a horizontal scrolling system for dynamically controlling the scrolling of data from a stored list in a window on a display screen, said horizontal scrolling system comprising:

means for adjusting the size of the window available for the display of data in the stored list in response to a first user command;

means for receiving a second user command to scroll through the data in the stored list in a specified direction;

means, responsive to said means for receiving, for determining if the stored list can be scrolled in the direction specified by the second user command;

memory means for storing a list of data to be displayed in said window on the display screen;

means for determining the dynamic width of the window available to display the data;

means, cooperative with said memory means and said means for determining the available dynamic width, for determining the must display column in said stored list and reducing the available dynamic width by the width of this column;

means, cooperative with said memory means, for scanning the stored list for columns designated as sticky and placing said sticky columns in said window; and means, cooperative with said means for determining the must display column and said means for scanning and placing sticky columns, for placing the must display column and additional columns from said stored list in the remaining available dynamic width of the window.

11. The horizontal scrolling system of claim 10 wherein said means for scanning the stored list and placing sticky columns includes:

means for determining the width of each sticky column in the stored list;

means for comparing the width of each sticky column with the available dynamic width remaining in the window; and means, cooperative with said means for determining and said means for comparing the width of each sticky column, for reducing the available dynamic width remaining after each sticky column is placed in the window.

12. The horizontal scrolling system of claim 10 wherein said means for placing additional columns includes:

means for determining the width of each additional column in the stored list;

means for comparing the width of each additional column with the available dynamic width remaining in the window; and means, cooperative with said means for determining and said means for comparing the width of each additional column, for reducing the available dynamic width remaining after each additional column is placed in the window.

13. A method for dynamically controlling the display of data in a window on a display screen when horizontally scrolling to the right through the data which is contained in a stored list, said method comprising:

adjusting the size of the window available for the display of data in the stored list in response to a user command;

determining if the stored data can be scrolled to the right;

determining the column that must be displayed in the window on the display screen after the scroll operation is complete;

scanning through the columns in the stored list sequentially to determine the columns that are designated as sticky and placing said sticky columns in the window; and placing said must display column and additional columns from said stored list in the available space remaining in the window until no additional columns can be completely placed.

14. The method of claim 13 wherein the step of determining the column that must be displayed in the window on the display screen includes examining the rightmost column currently displayed in the window, marking the rightmost column as the column that must be displayed if the rightmost column is partially visible, and marking the column in the stored list following the rightmost column as the column that must be displayed if the rightmost column is fully visible.

15. The method of claim 13 wherein the step of placing sticky columns in the window includes:

decreasing the available space in the window by the width of the column that must be displayed;

determining sequentially the width of each column in the stored list that is designated as sticky;

comparing the width of each sticky-column with the available space remaining in the window and placing each sticky column in the window if its width does not exceed the available space remaining; and reducing the available space remaining by the width of each sticky column placed in the window.

16. The method of claim 13 wherein the step of placing additional columns in the window includes:

determining sequentially the width of each additional column that is to the right of the column that must be displayed;

comparing the width of each additional column with the available space remaining in the window and placing each additional column if its width does not exceed the available space; and reducing the available space remaining by the width of each additional column placed in the window.

17. The method of claim 15 wherein the step of placing sticky columns further includes removing the designation as sticky of each sticky column that cannot be placed within the available space remaining in the window, and processing each sticky column no longer designated as sticky as an additional column until the width of the window is changed.

18. The method of claim 15 wherein the step of placing sticky columns further includes temporarily suppressing each sticky column that cannot be fully accommodated with the must display column in the available space remaining in the window.

19. The method of claim 16 wherein the step of placing additional columns further includes partially placing a column during a scroll to the right if its width exceeds the available space remaining and terminating the horizontal scrolling of data when no available space remains.

20. A method for dynamically controlling the display of data in a window on a display screen when horizontally scrolling to the left through the data which is contained in a stored list, said method comprising:

adjusting the size of the window available for the display of data in the stored list in response to a user command;

determining if the stored data can be scrolled to the left;

determining the column that must be displayed in the window on the display screen after the scroll operation is complete;

scanning through the columns in the stored list sequentially to determine the columns that are designated as sticky and placing said sticky columns in the window; and placing said must display column and additional columns from said stored list in the available space remaining in the window until no additional columns can be completely placed.

21. The method of claim 20 wherein the step of determining the column that must be displayed in the window on the display screen includes determining the first column that is not sticky and that is currently fully or partially visible in the window, and marking the previous column in the stored list as the column that must be displayed.

22. The method of claim 20 wherein the step of placing sticky columns in the window includes:

decreasing the available space in the window by the width of the column that must be displayed;

determining sequentially the width of each column in the stored list that is designated as sticky;

comparing the width of each sticky column with the available space remaining in the window and placing each sticky column in the window if its width does not exceed the available space remaining; and reducing the available space remaining by the width of each sticky column placed in the window.

23. The method of claim 20 wherein the step of placing additional columns in the window includes:

determining sequentially the width of each additional column that is to the left of the column that must be displayed;

comparing the width of each additional column with the available space remaining in the window and placing each additional column if its width does not exceed the available space; and reducing the available space remaining by the width of each additional column placed in the window.

24. The method of claim 22 wherein the step of placing sticky columns further includes removing the designation as sticky of each sticky column that cannot be placed within the available space remaining in the window, and processing each sticky column no longer designated as sticky as an additional column until the width of the window is changed.

25. The method of claim 22, wherein the step of placing sticky columns further includes temporarily suppressing each sticky column that cannot be fully accommodated with the must display column in the available space remaining in the window.

26. The method of claim 23 further including the steps of determining if at least one column located to the immediate right of the must display column in a scroll to the left can be at least partially displayed in the available space remaining in the window after the placement of the sticky columns, the must display column, and any additional columns to the left of the must display column, and then placing each of said columns located to the immediate right that can be at least partially displayed.

27. A computer program for the dynamic control of horizontal scrolling of data from a stored list in a window on a display screen, said program method comprising:

means for adjusting the size of the window available for the display of data in the stored list in response to a first user command;

means for receiving a second user command to scroll through the data in the stored list in a specified direction;

means for determining if the stored list can be scrolled in the direction specified by the second user command;

means for determining the dynamic width of the window available for the display of data;

means for determining a must display column in said stored list and reducing the space available in the window by the width of the must display column;

means for scanning through the columns in the stored list to determine the columns that are designated as sticky and placing said sticky columns in the window; and means for placing said must display column and additional columns from said stored list in the available space remaining in the window until the window is full.

28. The computer program of claim 27 wherein the means for placing sticky columns includes:

means for determining the width of each sticky column in said stored list;

means for comparing the width of each sticky column with the available space remaining in the window; and means for reducing the available space remaining by the width of each sticky column after it is placed in the window.

29. The computer program of claim 27 wherein the means for placing additional columns includes:

means for determining the width of each additional column in said stored list;

means for comparing the width of each additional column with the available space remaining in the window; and means for reducing the available space remaining by the width of each additional column after it is placed in the window.

* * * * *